United States Patent [19]

Chakravarty et al.

[11] Patent Number: 4,879,643
[45] Date of Patent: Nov. 7, 1989

[54] DECENTRALIZED CAUTIOUS ADAPTIVE CONTROL SYSTEM

[75] Inventors: Abhijit J. M. Chakravarty, Renton; Dagfinn Gangsaas, Bellevue, both of Wash.; John B. Moore, Weetangaera, Australia

[73] Assignee: The Boeing Company, Seattle, Wash.

[21] Appl. No.: 122,780

[22] Filed: Nov. 19, 1987

[51] Int. Cl.$^4$ .............................................. G05B 13/02
[52] U.S. Cl. ................................... 364/148; 318/561; 364/161
[58] Field of Search ............................... 364/148–163; 312/560, 561, 565, 567, 569, 562, 564

[56] References Cited

U.S. PATENT DOCUMENTS

| | | | |
|---|---|---|---|
| 3,079,108 | 2/1963 | Falkner et al. | 244/77 |
| 3,109,970 | 11/1963 | Smyth | 318/28 |
| 3,137,459 | 6/1964 | Smith et al. | 244/77 |
| 3,177,349 | 4/1965 | Zaborsky et al. | 235/152 |
| 3,216,676 | 11/1965 | Brown et al. | 244/77 |
| 3,241,077 | 3/1966 | Smyth et al. | 328/165 |
| 3,412,299 | 11/1968 | Buscher et al. | 318/18 |
| 3,428,791 | 2/1969 | Chandos | 235/151.1 |
| 3,435,422 | 3/1969 | Gerhardt et al. | 340/172.5 |
| 3,466,946 | 5/1969 | Andeen | 235/150.1 |
| 3,555,252 | 1/1971 | Garden | 235/151.1 |
| 3,622,767 | 11/1971 | Koepcke | 235/150.1 |
| 3,700,866 | 10/1972 | Taylor | 364/148 X |
| 3,857,535 | 12/1974 | Osder | 244/77 |
| 3,912,912 | 10/1975 | Pollock et al. | 364/148 X |
| 4,349,868 | 9/1982 | Brown | 364/157 |
| 4,410,948 | 10/1983 | Doniger et al. | 364/148 X |
| 4,420,808 | 12/1983 | Diamond et al. | 364/161 X |
| 4,456,862 | 6/1984 | Yueh | 318/561 |
| 4,494,202 | 1/1985 | Yueh | 364/462 |

FOREIGN PATENT DOCUMENTS

1163372  6/1984  Canada ............................... 354/143

OTHER PUBLICATIONS

Zonneveld, "Cautious Control", *Journal A*, vol. 24, No. 1, Jan. 1983.
Molusis et al., "Dual Adaptive Control Based Upon Sensitivity Functions", *Proceedings* of 23rd *Conference on Decision and Control*, Las Vegas, NV, Dec. 1984.
De Vlieger, "A cautious Time-Optical Control Algorithm for Stochastic Control Systems with Additional Boundary Constraints", Dept. of Electrical Engineering, Control Laboratory, Delft Univ. of Technology, the Netherlands.
Krolikowski, "Application of Input-Signal Design in System Identification for Adaptive Control", *International Journal of Systems Science*, 1986, vol. 17, No. 2, pp. 305–318.
Pehrson, "Cautious Stochastic Computer Control Applied to Concrete Mixing", 5th IFAC/IFIP *International Conference on Applications to Process Control*, The Hague, Netherlands, June 1977.
Adams, "Understanding Adaptive Control", *Automation*, Mar. 1970.
Kumar et al., "Minimum Variance Control Harnessed for Non–Minimum–Phase Plants", *IFAC Control Science and Technology* (8th *Triennial World Congress*), Kyoto, Japan, 1981.
Astrom et al., "System Identification -A survey", Automatich, vol. 7, pp. 123–162, 1971.
Astrom et al., "Computer Controlled Systems", Prentice-Hall, Inc. 1984, pp. 353–355.
Chakravarty et al., "Adaptive flutter Suppression in the Presence of Turbulence", *American Control Conference* June 1986.

Primary Examiner—A. D. Pellinen
Assistant Examiner—A Jonithan Wysocki
Attorney, Agent, or Firm—Dellett, Smith-Hill & Bedell

[57] ABSTRACT

An output vector produced by a plant in response to an input vector is filtered by a plurality of bandpass filters, each filter having a different pass band. A filtered output vector from each filter is provided as input to a separate adaptive feedback controller, and feedback vectors produced by the separate controllers are summed to provide the input vector to the plant. Each adaptive feedback controller continuously identifies an open-loop transfer function of the plant characterizing a particular frequency band of plant operation, and continuously adjusts its own open-loop transfer function so that the poles of the closed-loop transfer function of the plant for that particular frequency mode of operation are assigned to constant stable values despite changes in the open-loop transfer function of the plant.

20 Claims, 4 Drawing Sheets

DECENTRALIZED CAUTIOUS ADAPTIVE CONTROL SYSTEM

BACKGROUND OF THE INVENTION

The present invention relates in general to control systems and in particular to a decentralized, cautious adaptive control system.

A "plant" can be characterized by an "open-loop" transfer function relating its outputs to its inputs. A "feedback controller" monitors one or more outputs of the plant and adjusts one or more control inputs so that the outputs are driven to desired states. A feedback controller also has a transfer function relating its sensor inputs to its control outputs. The "closed-loop" transfer function of a plant augmented by a feedback controller is thus a function of the transfer functions of both the plant and the controller. When the open-loop transfer function of a plant is known and constant, the transfer function of a feedback controller may be selected so that the closed-loop transfer function of the plant optimizes plant response with respect to various criteria, including system stability. However, the open-loop transfer function of many plants can change, and the feedback signal provided to the controller may make the plant unstable.

An "adaptive" feedback controller has a transfer function that changes to compensate for changes in the open-loop transfer function of a plant in order that plant operation remains stable. An adaptive controller must be able to identify the open-loop transfer function of the plant and adjust its own transfer function so that the closed-loop transfer function of the plant satisfies predetermined criteria. However, the identification of the plant's new open-loop transfer function following an abrupt change can be time consuming, and, until the new open-loop transfer function is accurately identified and the transfer function of the controller is appropriately adjusted, the output signals produced by an adaptive controller may still cause the plant to become unstable.

The paper "Adaptive Flutter Suppression in the Presence of Turbulence", by Abhijit Chakravarty, Dagfinn Gangsaas, and John B. Moore, published in June, 1986 by the American Control Conference, and incorporated herein by reference, describes a "cautious" adaptive flutter controller that monitors output signals of accelerometers mounted on the wings of an aircraft and produces output feedback control signals for the aircraft's ailerons for dampening detected wing flutter. Following an abrupt change in an aircrart s response to aileron controls due, for example, to sudden wing damage the flutter controller temporarily attenuates its output feedback control signals so that the feedback signals do not strongly affect aileron movement, thereby avoiding the possibility that the feedback signals will cause the aircraft to become unstable. As the controller acquires more "confidence" in its identification of the plant's new open-loop transfer function, it decreases the amount of feedback signal attenuation whereby the feedback signals more strongly influence aileron movement. The cautious adaptive control system described in the referenced paper thus prevents the controller from destabilizing the aircraft following a change in its open-loop transfer function

SUMMARY OF THE INVENTION

In accordance with the invention, an output vector (a set of one or more output signals) produced by a plant in response to an input vector (a set of one or more input control signals) is filtered by a plurality of bandpass filters, each filter having a different pass band. The output vector produced by each filter is provided as input to a separate adaptive feedback controller, and feedback vectors produced by the separate controllers are summed to provide the input vector to the plant. Each adaptive feedback controller continuously identifies an open-loop transfer function of the plant characterizing a particular frequency band of plant operation, and continuously adjusts its own open-loop transfer function so that the poles of the closed-loop transfer function of the plant for that particular frequency mode of operation are assigned to stable values despite changes in the open-loop transfer function of the plant. By decentralizing feedback control of the plant by frequency bands, the complexity of the open-loop transfer function that each adaptive feedback controller must identify is reduced and the transfer function identification process can be carried out quickly by a set of small, inexpensive and relatively slow microprocessors rather than by a single large computer.

It is accordingly an object of the invention to provide an improved cautious, adaptive feedback control system that can quickly adjust to changes in transfer function of a complex plant.

The subject matter of the present invention is particularly pointed out and distinctly claimed in the concluding portion of this specification. However, both the organization and method of operation of the invention, together with further advantages and objects thereof, may best be understood by reference to the following description taken in connection with accompanying drawings wherein like reference characters refer to like elements.

DRAWINGS

DETAILED DESCRIPTION

Feedback controllers adjust input control signals to a plant in response to changes in output signals produced by the plant. When properly designed, feedback controllers improve the way a plant responds to control signals and disturbances by changing the open-loop transfer function of the plant to a more desirable closed-loop transfer function. An "adaptive" feedback controller monitors the open-loop transfer function of the plant and alters its own transfer function when the open-loop transfer function changes, so that the plant's closed-loop transfer function continues to satisfy predetermined criteria. A "cautious", adaptive feedback controller includes a mechanism for determining the accuracy of its estimate of the open-loop transfer function of the plant and restricts the amount of feedback that it provides when the accuracy of the estimate is low so as to avoid destabilizing the plant with inappropriate feedback signals. In a "decentralized" feedback control system, various aspects of a plant are independently controlled by separate feedback controllers. The present invention relates to a frequency decentralized feedback control system, in which feedback control of a plant is decentralized by separating frequency bands of plant output signals while providing a separate adaptive feedback controller to monitor each frequency band to identify the plant's open-loop transfer function with respect to that frequency band, and to adaptively control its own transfer function so as to provide a stable closed-loop transfer function with respect to that frequency band.

Figure 1:
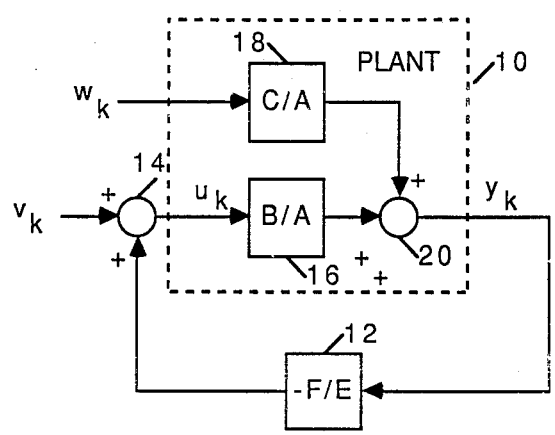
FIG. 1 is a block diagram of a plant controlled by a non-adaptive feedback controller of the prior art.

With reference to FIG. 1, a plant 10 produces a set of one or more output signals (output "vector" $y_k$) at time k and responds to a set of one or more input signals (input vector $u_k$) and a set of disturbances (disturbance vector $w_k$). A feedback controller 12 monitors the output vector $y_k$ and produces in response thereto an output vector that is summed with an externally generated control vector $v_k$, if any, by a summer 14 to produce plant input vector $u_k$.

The current state of plant 10 may be modeled as a state vector $x_k$, a function of all of its past control inputs ($u_{k-1}$, $u_{k-2}$, ...). past and present disturbances ($w_{k-1}$, $w_{k-2}$ ... and past outputs ($y_{k-1}$, $y_{k-2}$ ...) at sampling times k-1, k-2 ... k-n, where n is an integer. The output vector $y_k$ of the plant may be modeled as a function of its internal state $x_k$ and the disturbance vector $w_k$ at time k in accordance with the expressions:

$$y_k = \theta T_k x_k + w_k \qquad [1]$$

$$\theta^T_k = [a_1 a_2 \ldots b_2 b_1 \ldots c_1 c_2 \ldots] \qquad [2]$$

and $$x^T_k = [-y_{k-1} - y_{k-2} \ldots u_{k-1} u_{k-1} \ldots w_{k-1} w_{k-1}] \qquad [3]$$

where $\theta_k$ is a vector of real numbers, and $\theta^T_k$ denotes $\theta_k$ transposed. In equation [2] the number of elements in matrix rows $a_1$, $a_2$, ... $b_2$, $b_1$, ... and $c_1$, $c_2$, ... is determined by the number of elements of the output vector $y_k$.

The plant may also be modeled by the expression:

$$A_k y_k = B_k u_k + C_k w_k \qquad [4]$$

derived from equations [1]–[3] wherein $$A = [0 \; a_1 z^{-1} \; a_2 z^{-2} \ldots] \qquad [5]$$

$$B = [0 \; b_1 z^{-1} \; b_2 z^{-2} \ldots] \qquad [6]$$

and $$C = [1 \; c_1 z^{-1} \; c_2 z^{-2} \ldots] \qquad [7]$$

where A, B and C are matrices in the complex frequency domain. Equation [4] may be rewritten $$k = (B_k/A_k) u_k + (C_k/A_k) w_k \qquad [8]$$

which is similar to equation [1]. FIG. 1 depicts plant 10 as being modeled by a functional block 16 having an open-loop transfer function B/A operating on input vector $u_k$ and a functional block 18 having a transfer function C/A operating on disturbance vector $w_k$, the outputs of blocks 16 and 18 being summed by a summer 20 to provide output vector $y_k$ in accordance with equation [8].

Since feedback controller 12 of FIG. 1 has an open-loop transfer function −F/E, the closed-loop transfer function matrix G of the system of FIG. 1 is:

$$\begin{aligned} G &= (B/A)/[1 + (B/A)(F/E)] \\ &= BE/(AE + BF) \\ &= BE/H \end{aligned}$$

where the zeros of $H \equiv AE+BF$ are the closed-loop poles of the transfer function G. It is well-known to those skilled in the art that the zeros of H should be inside the unit circle of the z-plane in order to ensure that the plant is stable. The values of elements of matrices E and F are thus chosen to place the zeros of H within the unit circle of the z-plane and also to adjust plant operation in terms of its speed of response to input control signals and its ability to quickly recover from disturbances.

Figure 2:
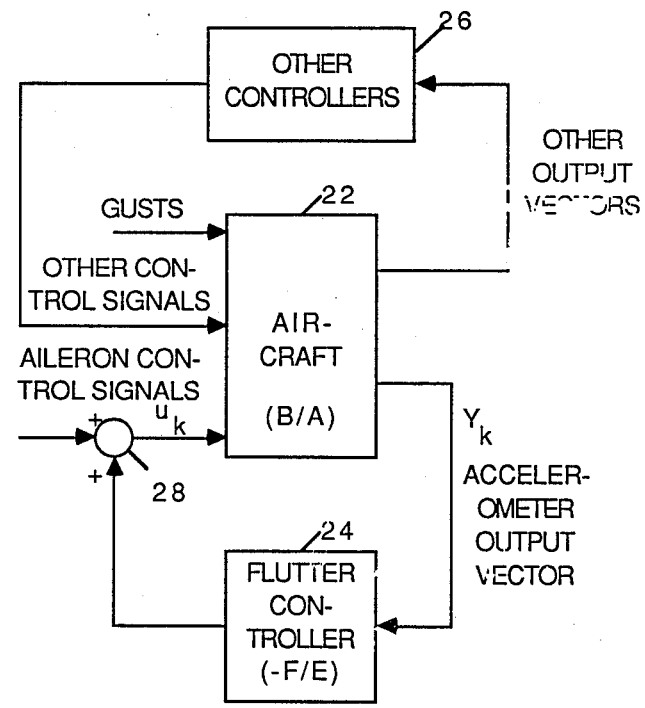
FIG. 2 is a block diagram of an aircraft controlled by an non-adaptive flutter controller of the prior art.

For example, as shown in FIG. 2, the plant may be an aircraft 22 having a set of accelerometers mounted at various locations on its wings, the accelerometer output signals being digitized by analog-to-digital converters to produce an output vector $y_k$ to a flutter controller 24. Other controllers 26, including for example a pilot, may monitor other output signals produced by aircraft 22 and provide control signal vectors which control various aspects of the aircraft including aileron positioning. Controller 24 supplies a control vector which is summed with aileron control siqnals from controllers 26 by a summer 28 to form an input vector $u_k$ comprising signals controlling the position of the aircraft's ailerons. Gusts, air turbulence or other disturbances can cause the aircraft's wings to vibrate ("flutter") at various natural frequencies, and the wing flutter causes the accelerometers to produce oscillating output signals. Since excessive wing flutter can structurally damage an aircraft, controller 24 is adapted to make continuous small adjustments to the positioning of ailerons so as to dampen wing flutter. Thus the transfer function (−F/E) of controller 24 is designed to provide a suitable closed-loop transfer function (BE/H) for the aircraft/controller system for a given open-loop transfer function (B/A) of one aircraft relating the aileron input control vector $u_k$ to its output flutter indicating vector $Y_k$.

The feedback control system of FIG. 1 is suitable when the transfer function B/A of the plant does not change. However, in some cases B and A can change, and when they do, the value of H changes. If the change in B and A causes the zeros of H to move outside the unit circle of the z-plane, the plant can become unstable. In the example aircraft system of FIG. 2, damage to a wing or aileron can change the way that the aircraft responds to the aileron control input vector and the feedback control vector produced by controller 24 could result in the aircraft becoming unstable.

Figure 3:
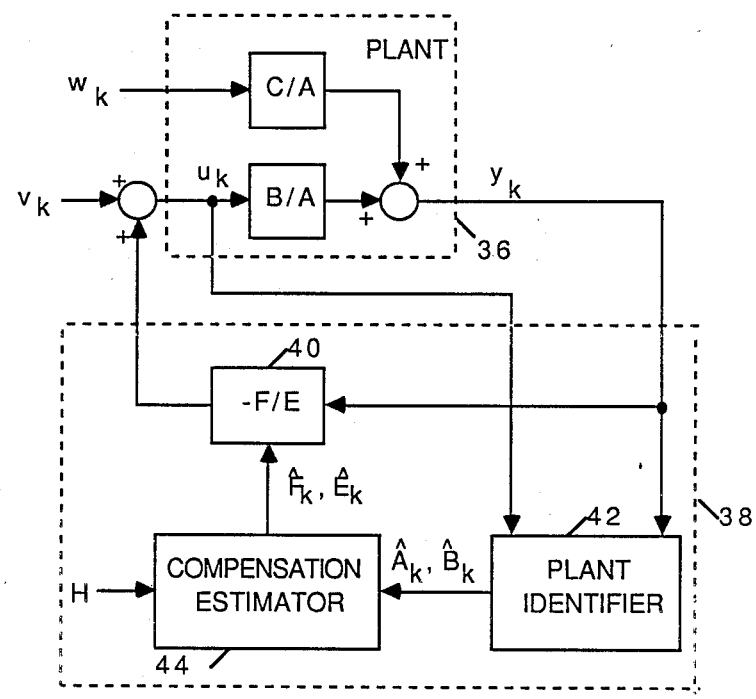
FIG. 3 is a block diagram of a plant controlled by an adaptive feedback controller of the prior art.

FIG. 3 illustrates an adaptive feedback control system wherein a plant 36, similar to plant 10 of FIG. 1 but having a transfer function that can vary with time, is controlled by an adaptive feedback controller 38. Controller 38 includes a feedback controller 40 having an adjustable transfer function −F/E for supplying the controller output vector in response to the plant output vector $Y_k$. A plant identifier 42 monitors the input and output vectors $u_k$ and $y_k$ of plant 10, and estimates therefrom the current values of plant transfer function parameters $A_k$ and $B_k$. Plant identifier 42 then passes the estimates $\hat{A}_k$ and $\hat{B}_k$ to a compensation estimator 44 which estimates values of $E_k$ and $F_k$ required to provide a closedloop system transfer function wherein H is a constant despite changes in $A_k$ and $B_k$. The compensation estimate $\hat{E}_k, \hat{F}_k$ provided by compensation estimator 44 is supplied to controller 40 which adjusts the value of $-F/E$ accordingly. Although he closed-loop transfer function of the plant can change, because $\hat{B}_k \hat{E}_k$ can change, the poles of the closed-loop transfer function remain fixed in place inside the unit circle of the z-plane and the plant remains stable.

Unfortunately plant identifier 42 takes a certain time to identify the plant (i.e., to accurately estimate $A_k$ and $B_k$) following an abrupt change in the open-loop transfer function of the plant, and until the plant identifier accurately identifies the plant, the value of the feedback transfer function $-F/E$ may be inappropriate and may drive poles of the closed-loop transfer function of the plant to outside of the unit circle of the z-plane. In such case the plant may become unstable before the adaptive controller 38 can adapt.

Figure 4:
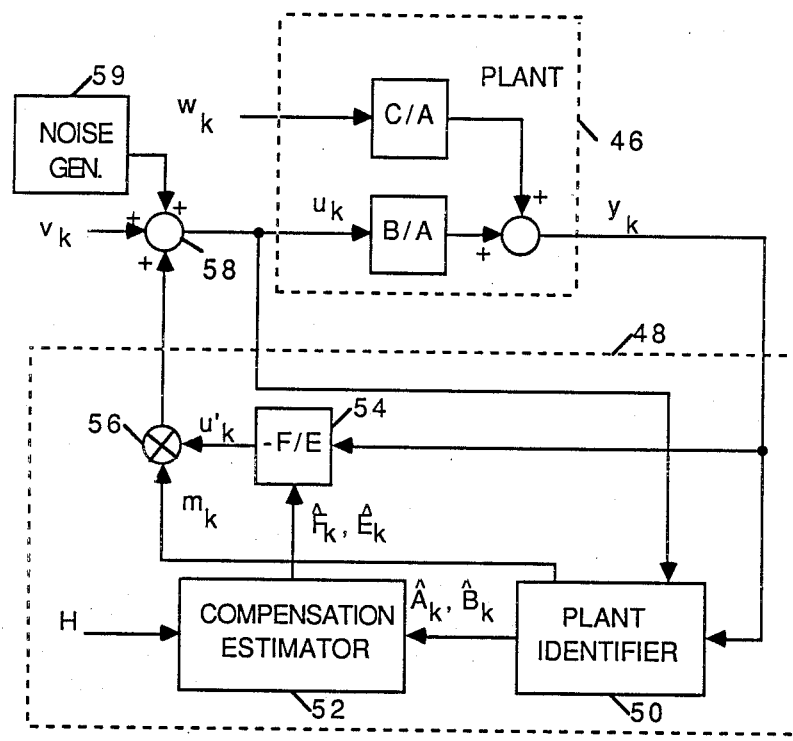
FIG. 4 is a block diagram of a plant controlled by a cautious, adaptive feedback controller of the prior art.

FIG. 4 is a block diagram of a plant 46 similar to plant 36 of FIG. 3 controlled by a cautious adaptive feedback controller 48 including a plant identifier 50, a compensation estimator 52 and an adjustable controller 54 which are similar to the plant identifier 42, compensation estimator 44 and adjustable controller 40 of FIG. 3 except that plant identifier 50 produces a "caution factor" output $m_k$ supplied to a multiplier 56. The output vector $u_k$ from controller 54 is also supplied to multiplier 56 which multiplies $u'_k$ by the caution factor to provide a feedback control vector which is summed with externally generated control vector $V_k$ (if any) in summer 58 to produce input control vector $u_k$ to plant 46.

The caution factor $m_k$ has a value that varies between 0 and 1 and is a measure of the "confidence" that the plant identifier 50 has in its estimate of $A_k$ and $B_k$. After detecting an abrupt deviation in the state of plant 46, plant identifier 50 sets the caution factor $m_k$ close to so the feedback control vector $u'_k$ has a small magnitude that does not substantially affect plant operation. Thus the plant operates in substantially open-loop mode and cannot be destabilized by controller 48. As the plant identifier 50 continues to monitor the input and outputs of plant 46, its confidence in its estimates of plant parameters $A_k$ and $B_k$ increases, and therefore it increases the value of caution factor $m_k$ toward 1. As $m_k$ increases toward 1, the feedback provided by controller 48 has a more substantial effect on plant operation and the plant begins to operate in its closedloop mode.

It should be noted that in order to estimate plant parameters $A_k$ and $B_k$ which will accurately predict plant behavior over a wide range of input vector frequencies, plant identifier 50 must observe the response of plant output vector $y_k$ while the plant input vector $u_k$ is oscillating over such range of frequencies. In a typical closed-loop control system a certain amount of white noise containing a wide range of frequencies circulates through the loop, and this noise may be of sufficient magnitude to provide the necessary plant stimulation to allow the plant identifier to accurately identify the plant over a wide frequency range. However, when the plant identifier 50 of FIG. 4 sets the caution factor near 0, the white noise is attenuated and may not be sufficient to permit the plant identifier to identify the plant. In such case it is helpful to introduce a small amount of white noise into the plant input, suitably from a noise generator 59 and added to the plants control input vector by summer 58.

The cautious, adaptive feedback control system of FIG. 4 is suitable for controlling relatively simple plants having input and output vectors comprising few signals and which operate over narrow frequency bands of interest. A simple plant can be characterized by transfer function parameters A and B that are relatively small matrices which can be estimated by plant identifier 50 by manipulating relatively low order matrices (as described in detail hereinbelow). In addition, for a simple plant the feedback parameters F and E are also low order matrices that can be estimated by a compensation estimator 52 manipulating relatively low order matrices (also described hereinbelow). Thus for a simple plant, plant identifier 50 and compensation estimator 52 can be implemented by a small, relatively slow digital computer. However, as the complexity of plant 46 increases, so too does the size of the matrices that the plant identifier 50 and compensation estimator 52 must handle, and the computer required to implement plant identifier 50 and compensation estimator 52 becomes large, fast and expensive. For example, wing flutter in a large aircraft is a complex phenomenon because the wings can vibrate at a wide variety of natural frequencies. To accurately model all modes of wing flutter, the state variable $x_k$ of equation [1] hereinabove would require a large number of terms which in turn would require that the A and B parameters forming the transfer function of the wing flutter control system of FIG. 2 comprise large matrices. It would generally be impractical to install in an aircraft a computer able to manipulate such matrices for identifying A and B and estimating E and F with reasonable speed.

Figure 5:
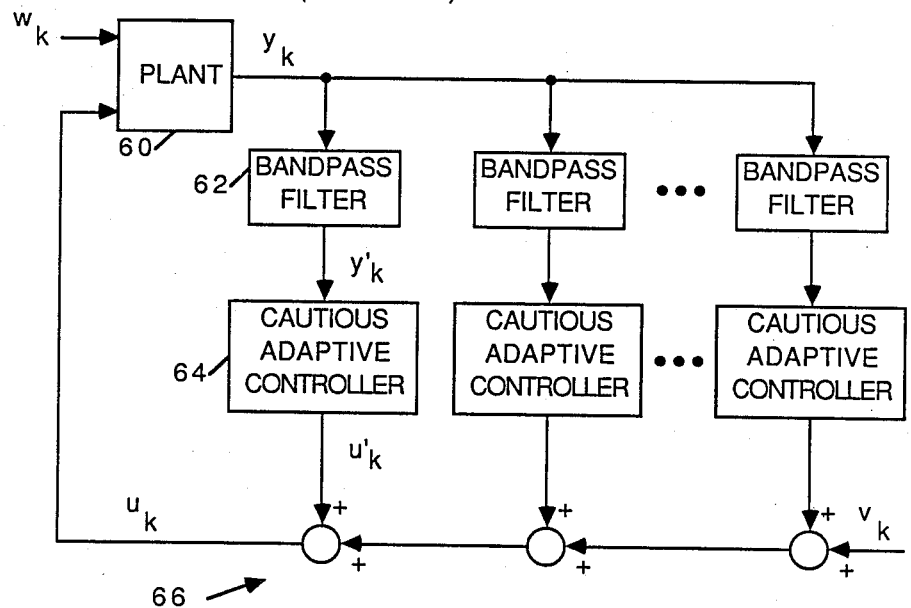
FIG. 5 is a block diagram of a plant controlled by a decentralized, cautious, adaptive feedback controller in accordance with the present invention.

FIG. 5 illustrates a decentralized, cautious adaptive control system in accordance with the present invention providing feedback control for a plant 60 similar to plant 46 of FIG. 4. The output vector $y_k$ of plant 60 is provided as input to a set of bandpass filters 62, each having a different pass band. Each bandpass filter 62 produces a filtered output vector $y'_k$ supplied as input to a separate cautious adaptive controller 64. The output vectors $u'_k$ produced by controllers 64 are summed with an externally generated control vector $v_k$ by a set of summers 66 to produce the plant 60 input vector $u_k$. Each controller 64 continuously identifies an open-loop transfer function of the plant characterizing a particular frequency band of plant operation, and continuously adjusts its own transfer function so that the poles of the closed-loop transfer function of the plant for that particular frequency mode of operation are assigned to constant values despite changes in the open-loop transfer function of the plant. By frequency band decentralizing feedback control of the plant, the complexity of the open-loop transfer function parameters that each adaptive feedback controller 64 must identify, and the complexity of the feedback parameters E and F that it must estimate, are reduced so that calculations required for the adaptation process can be carried out quickly by several small, inexpensive and relatively slow computers. Thus the decentralized adaptive control system of FIG. 5 can be implemented by a set of small microprocessors rather than by a large computer as required for the centralized system of FIG. 4.

Figure 6:
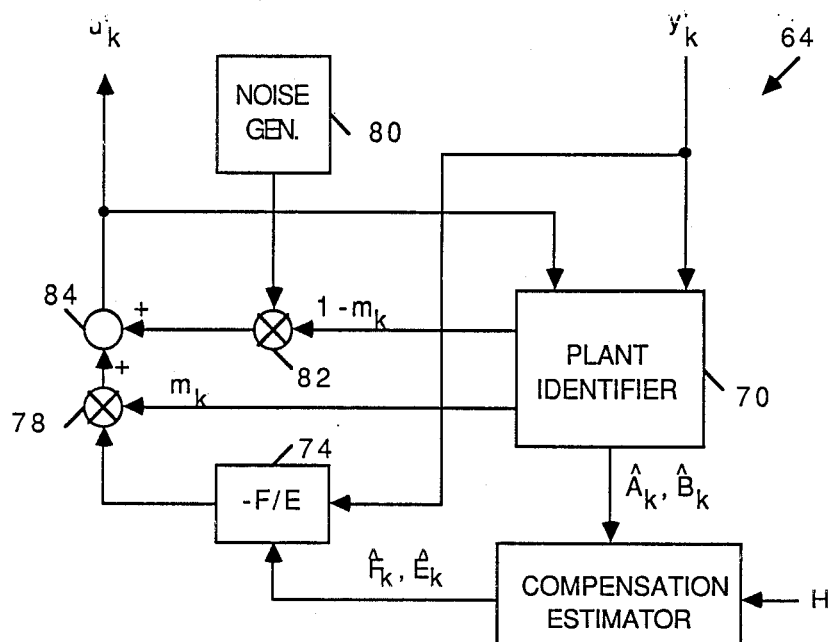
FIG. 6 is a block diagram of an individual cautious, adaptive feedback controller of FIG. 4.

FIG. 6 is a block diagram of a single cautious adaptive controller 64 of FIG. 5. The $y'_k$ output vector of a bandpass filter 62 and the input vector $u_k$ of plant 60 of FIG. 5 are provided as inputs to a plant identifier 70 which ascertains therefrom the current values of parameters $A_k$ and $B_k$ of the plant's open-loop transfer function The estimates $\hat{A}_k$ and $\hat{B}_k$ are supplied to a compensation estimator 72 forming the values of E and F needed to maintain $H = AE + BF$ constant. The compensation estimate k k is supplied to feedback controller 74 and controller 74 operates on its input vector Y'k with transfer function $-F/E$, controlled by compensation estimate $\hat{E}_k$, $\hat{F}_k$. The plant identifier 70 also provides the caution factor $m_k$. supplied along with the output of controller 74 as inputs to a multiplier 78. The plant identifier 70 further produces an output signal of magnitude equal to $1 - m_k$, provided together with the output of a noise generator 80 as inputs to multiplier 82. The outputs of multipliers 78 and 82 are summed by a summer 84 to supply the adaptive controller 64 output vector $u'_k$.

Noise generator 80 is characterized by a small magnitude output signal of frequency randomly varying over the pass band of the particular bandpass filter 62 supplying the $y'_k$ input to the adaptive controller 64. When the confidence factor $m_k$ is near one, the plant stimulation needed to permit plant identifier 70 to identify the plant parameters is provided by inherent noise of the closed-loop feedback circuit and the output of noise generator 80 is attenuated by multiplier 82. When the confidence factor is near 0, the output of the noise generator is less attenuated and provides stimulation to the plant.

Figure 7:
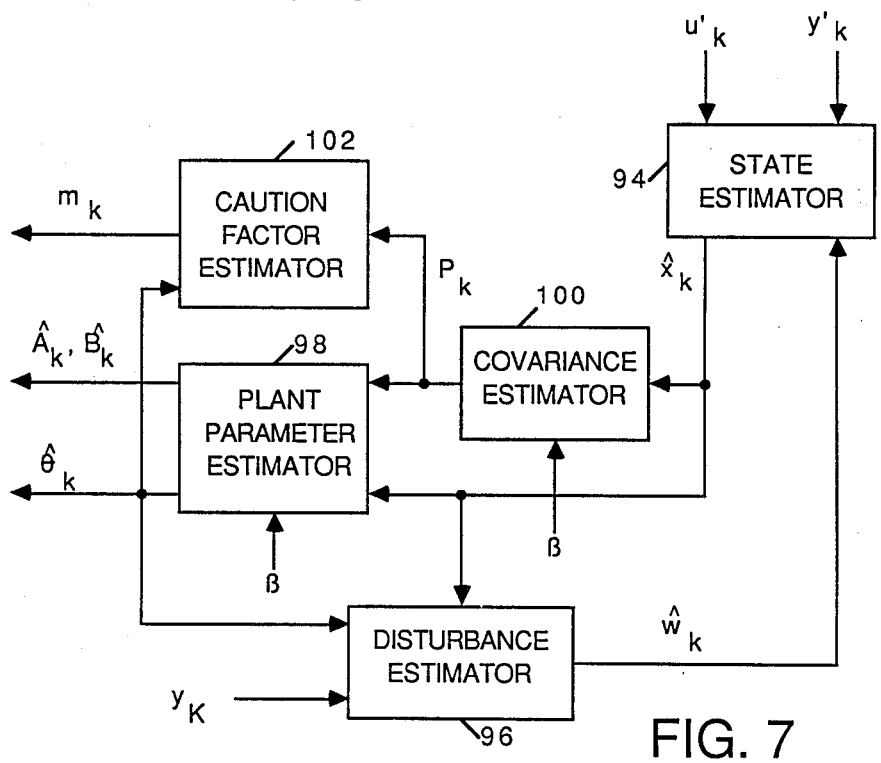
FIG. 7 is a block diagram of the plant parameter identifier of FIG. 6.

FIG. 7 is a detailed block diagram of the plant identifier 70 of FIG. 6. The $u'_k$ vector and the $y'_k$ vector are inputs to a state estimator 94. An estimate $\hat{w}_k$ of the disturbance vector $w_k$ of FIG. is produced by a disturbance estimator 96 and is supplied as an input to state estimator 94.. State estimator 94 remembers values of y', u and $\hat{w}$ at times k-1, k-2, ... k-n and estimates the state vector $x_k$ of equation [1] by evaluating the following expression:

$$\hat{x}_k = [-y'_{k-1} -y'_{k-2} \ldots u'_{k-1} u'_{k-1} \ldots \hat{w}_{k-1} \hat{w}_{k-1} \ldots] \quad [9]$$

which is similar to equation [3] hereinabove. The plant state vector estimate $\hat{x}_k$ is provided to plant parameter estimator 98 which produces the estimates $\hat{A}_k$ and $\hat{B}_k$ of the plant open-loop transfer function parameters. Terms representing plant output, input and disturbance vectors at times k-1, k-2 ... k-n may be included in equation [9] where n is an integer. When n is large, the plant parameter estimates formulated by plant parameter estimator 98 are relatively larger matrices which can more accurately reflect the nature of the plant. However, as the A and B matrices increase in size, the processing time for a computer implementing plant parameter estimator 98 also increases. Thus the size of n should be chosen to provide a desired optimal mix of accurate plant parameter identification and processing speed When the pass band is sufficiently narrow, the sampling frequency (i e., the inverse of the period between sample times k and k-1) is suitably 2 or 3 times the pass band frequency monitored by each controller and the value of n is suitably 2 or 4. In the simplest case, the state vector $x_k$ estimated by each adaptive controller has only 6 terms and is sufficient to convey amplitude and phase relationships between similar frequency components of the output vector and the input and disturbance vectors with reasonable accuracy. The sampling rate of the input to each controller 64 of FIG. 5 can be adjusted by utilizing decimating digital bandpass filters 62, each having a different decimation factor.

The $\hat{x}_k$ estimate vector is also supplied as input to a corvariance estimator 100 which outputs a "covariance" factor $P_k$ provided as input to the plant parameter estimator 98. The covariance factor is determined by evaluating the expression:

$$P^{-1} P^{-1} + \beta \hat{x}_k \hat{x}_k \quad [10]$$

where $\beta$ is a constant, suitably one. As the state estimate $\hat{x}_k$ converges, $P_k$ goes to 0.

Plant parameter estimator 98 formulates $\theta_k$ by evaluating the expression:

$$\hat{\theta}_k = \hat{\theta}_{k-1} + \beta P_k \hat{x}_k (y_k - \hat{\theta}^T_{k-1} \hat{x}_k) \quad [11]$$

$$= [a_1 a_2 \ldots b_2 b_1 \ldots c_1 c_2] \quad [12]$$

Once $\hat{\theta}_k$ has been determined, plant parameter estimator 98 can estimate $A_k$ and $B_k$ from the expressions:

$$\hat{A}_k = [0 \; a_1 z \; a_2 z] \quad [13]$$

and $$\hat{B}_k = [0 \; b_1 z^{-1} \; b_2 z^{-2} \ldots ]. \quad [14]$$

The disturbance estimator 96 has as its inputs $Y_k$, $\hat{x}_k$, $\hat{\theta}_k$ and estimates $w_k$ by evaluating the expression:

$$\hat{w}_k = y_k - T_k \hat{x}.$$

With reference to FIG. 6, compensation estimator 72 estimates the values of E and F by solving matrix equation:

$$H = \hat{A}_k \hat{E}_k + \hat{B}_k \hat{F}_k \quad [16]$$

for $\hat{E}_k$ and $\hat{F}_k$, where H is a predetermined constant matrix, the zeros of which are the assigned poles of the closed-loop transfer function of the plant. The caution factor estimator 102 of FIG. 7 computes caution factor $m_k$ from the $\hat{\theta}_k$ and $P_k$ outputs of plant parameter estimator 98 and covariance estimator 100 in accordance with the equation:

$$m_k = (\hat{\theta}_k P_k^{-1} \hat{\theta}_k)/3 + \hat{\theta}^T_k P_k^{-1} \hat{\theta}_k) \quad [17]$$

The frequency decentralized, adaptive feedback controller of the present invention is particularly suited to adaptive damping of wing flutter in an aircraft because flutter tends to take place at several discrete frequencies. When the wing-mounted accelerometer output vector is filtered by several bandpass filters, each passing a separate flutter frequency, each adaptive controller need only carry out the relatively simple task of controlling wing flutter at one frequency.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. Apparatus for controlling a plant producing a plant output vector in response to an input control vector, comprising:

means for filtering said plant output vector into a plurality of filtered output vectors, each comprising a separate frequency band of said plant output vector;

means for producing in response to each said filtered output vector a separate feedback control vector in accordance with an adjustable transfer function; and means for forming said input control vector in response to a combination of feedback control vectors.

2. A feedback control system for a plant producing an output vector in response to an input control vector, comprising:

a plurality of bandpass filters, each filtering said plant output vector to produce a separate filtered output vector;

a plurality of controllers, each corresponding to a separate one of said bandpass filters, each controller receiving the filtered output vector of its corresponding bandpass filter and producing in response thereto a separate feedback control vector in accordance with a feedback transfer function; and means for producing said input control vector in response to a combination of the feedback control vectors provided by said plurality of controllers.

3. The feedback control system in accordance with claim 2 wherein said plurality of bandpass filters have pass bands differing one from another.

4. The feedback control system in accordance with claim 2 wherein at least one of said controllers is an adaptive controller responsive to said input control vector and the filtered output vector produced by the corresponding one of said bandpass filters, said adaptive controller comprising means for identifying a plant transfer function relating the last mentioned output vector to said input control vector and for adjusting its feedback transfer function when said plant transfer function changes so that a combination of said plant transfer function and its feedback transfer function satisfies a predetermined criterion.

5. The feedback control system in accordance with claim 4 wherein said combination comprises a closed-loop transfer function and said predetermined criterion is satisfied by maintaining poles of said closed-loop transfer function at desired constant values.

6. The feedback control system in accordance with claim 2 wherein one of said controllers is an adaptive controller comprising:

plant parameter estimating means responsive to said input control vector and the filtered output vector received by said one controller for generating a plant parameter estimate characterizing a plant transfer function relating the last mentioned filtered output vector to said input control vector;

compensation estimating means responsive to said plant parameter estimate for generating a compensation estimate characterizing a feedback transfer function such that a combination of said plant parameter estimate and said compensation estimate satisfies a predetermined criterion; and feedback means responsive to the filtered output vector as received by said one controller for producing a feedback control vector in accordance with said feedback transfer function.

7. The feedback control system in accordance with claim 2 wherein one of said controllers is a cautious adaptive controller comprising:

plant parameter estimating means responsive to said input control vector and the filtered output vector received by said one controller for generating a plant parameter estimate characterizing a plant transfer function relating the last mentioned filtered output vector to said input control vector and for producing a caution factor indicating an estimated accuracy with which said plant parameter estimate characterizes said plant transfer function;

compensation estimating means responsive to said plant parameter estimate for generating a compensation estimate characterizing a feedback transfer function such that a combination of said plant parameter estimate and said compensation estimate satisfies a predetermined criterion; and feedback means responsive to the filtered output vector as received by said one controller for producing a feedback control vector in accordance with a combination of said feedback transfer function and said caution factor.

8. A feedback control system for a plant producing a plant output vector in response to an input control vector in accordance with a plurality of time-varying plant transfer functions, each plant transfer function relating a separate frequency band of said plant output vector to said input control vector, said feedback control system comprising:

a plurality of bandpass filters, each filtering said plant output vector to form a separate filtered output vector, wherein said plurality of bandpass filters have pass bands differing one from another;

a plurality of controllers including at least one adaptive controller, each receiving the filtered output vector of a separate one of said bandpass filters and producing in response thereto a separate feedback control vector in accordance with a feedback transfer function, wherein said at least one adaptive controller comprises means responsive to said input control vector and the filtered output vector of one of said bandpass filters for identifying therefrom one of said plant transfer functions, said at least one adaptive controller adjusting its feedback transfer function when said one plant transfer function changes so that a combination of said plant transfer function and the feedback transfer function of said one adaptive controller satisfies a predetermined criterion; and means for producing said input control vector in response to a combination of feedback control vectors from said plurality of controllers.

9. A feedback control system for a plant producing a plant output vector in response to an input control vector in accordance with a plurality of time-varying plant transfer functions, each plant transfer function relating a separate frequency band of said plant output vector to said input control vector, said feedback control system comprising:

a plurality of bandpass filters, each filtering said plant output vector to provide a separate filtered output vector, wherein said plurality of bandpass filters have pass bands differing one from another;

a plurality of adaptive controllers, each receiving the filtered output vector of a separate one of said bandpass filters and supplying in response thereto a separate feedback control vector in accordance with a feedback transfer function, each adaptive controller comprising plant parameter estimating means responsive to said input control vector and said filtered output vector of said separate one of said bandpass filters for generating in response thereto a plant parameter estimate characterizing one of said plant transfer functions and for producing caution factor indicating an estimated accuracy with which said plant parameter estimate characterizes said one plant transfer function, compensation estimating means responsive to said plant parameter estimate for generating a compensation estimate characterizing a feedback transfer function such that a combination of said plant parameter estimate and said compensation estimate satisfies a predetermined criterion, and feedback means responsive to said filtered output vector for producing an output feedback control vector in accordance with a combination of the feedback transfer function characterized by said compensation estimate and said caution factor; and means for supplying said input control vector in response to a combination of feedback control vectors from said plurality of adaptive controllers.

10. The feedback controller in accordance with claim 9 wherein said combination comprises a closed-loop transfer function and said predetermined criterion is satisfied by maintaining poles of said closed-loop transfer function at desired constant values.

11. A method for controlling a plant producing a plant output vector in response to an input control vector in accordance with a plurality of time-varying plant transfer functions, each plant transfer function relating a separate frequency band of said plant output vector to said input control vector, the method comprising the steps of:

filtering said plant output vector into a plurality of filtered output vectors, each comprising a separate frequency band of said plant output vector;

producing in responce to each filtered output vector a separate feedback control vector in accordance with a separate feedback transfer function; and forming said input control vector in response to a combination of said separate feedback control vectors.

12. The method in accordance with claim 11 further comprising the steps of:

identifying from said input control vector and at least one of said filtered output vectors at least one of said plant transfer functions; and adjusting at least one feedback transfer function when said at least one plant transfer function changes so that a combination of said at least one plant transfer function and said at least one feedback transfer function satisfies a predetermined criterion.

13. The method in accordance with claim 12 wherein said combination comprises a closed-loop transfer function and said predetermined criterion is satisfied by maintaining poles of said closed-loop transfer function at desired constant values.

14. The method in accordance with claim 11 further comprising the steps of:

generating in response to said input control vector and at least one of said filtered output vectors a plant parameter estimate characterizing at least one of said plant transfer functions;

generating in response to said plant parameter estimate a compensation estimate characterizing at least one of said feedback transfer functions such that a combination of said plant parameter estimate and said compensation estimate satisfies a predetermined criterion; and producing in response to said at least one filtered output vector at least one feedback control vector in accordance with said at least one feedback transfer function characterized by said at least one compensation estimate.

15. A method for controlling a plant producing a plant output vector in response to an input control vector in accordance with a plurality of time-varying plant transfer functions, each plant transfer function relating a separate frequency band of said plant output vector to said input control vector, the method comprising the steps of:

filtering said plant output vector into a plurality of filtered output vectors, each comprising a separate frequency band of said plant output vector;

producing in response to each filtered output vector a separate feedback control vector in accordance with a separate feedback transfer function; and forming said input control vector in response to a combination of said separate feedback control vectors, wherein the step of producing in response to each filtered output vector a separate feedback control vector in accordance with a separate feedback transfer function comprises the substeps of:

generating in response to said input control vector and said filtered output vector a plant parameter estimate characterizing one of said plant transfer functions;

producing a caution factor indicating an estimated accuracy with which said plant parameter estimate characterizes said one plant transfer function;

generating in response to said plant parameter estimate a compensation estimate characterizing a feedback transfer function such that a combination of said plant parameter estimate and said compensation estimate satisfies a predetermined criterion; and providing in response to said filtered output vector an output feedback control vector in accordance with a combination of the feedback transfer function characterized by said compensation estimate and said caution factor.

16. The feedback controller in accordance with claim 15 wherein said combination comprises a closed-loop transfer function and said predetermined criterion is satisfied by maintaining poles of said closed-loop transfer function at desired constant values.

17. A method for controlling a plant producing a plant output vector in response to an input control vector in accordance with a plurality of time-varying plant transfer functions, each plant transfer function relating a separate frequency band of said plant output vector to said input control vector, the method comprising the steps of:

filtering said plant output vector to form a filtered output vector comprising a particular frequency band of said plant output vector;

identifying in response to said input control vector and said filtered output vector one of said plant transfer functions;

generating a feedback control vector in response to said filtered output vector in accordance with a feedback transfer function adjusted so that a combination of said identified plant transfer function and said feedback transfer function satisfies a predetermined criterion; and supplying said input control vector in response to said feedback control vector.
controller in accordance 18. The method in accordance with claim 17 wherein said combination comprises a closed-loop transfer function and said predetermined criterion is satisfied by maintaining poles of said closed-loop transfer function at desired constant values.

19. A method for controlling a plant producing a plant output vector in response to an input control vector in accordance with a plurality of time-varying plant transfer functions, each plant transfer function relating a separate frequency band of said plant output vector to said input control vector, the method comprising the steps of:
   filtering said plant output vector to provide a plurality of filtered output vectors each representing a separate frequency band of said plant output vector;
   generating in response to said input control vector and each said filtered output vector a separate plant parameter estimate characterizing a separate one of said plant transfer functions;
   producing a plurality of caution factors each indicating an estimated accuracy with which a corresponding plant parameter estimate characterizes said one of said plant transfer functions;
   generating in response to each said plant parameter estimate a compensation estimate characterizing a feedback transfer function such that a combination of one plant parameter estimate and said compensation estimate satisfies a predetermined criterion;
   providing in response to each said filtered output vector a separate feedback control vector in accordance with a combination of a feedback transfer function characterized by a separate one of said compensation estimates and a separate one of said caution factors; and
   producing said input control vector in response to a combination of feedback control vectors provided in response to said filtered output vectors.

20. The method in accordance with claim 19 wherein said combination comprises a closed-loop transfer function and said predetermined criterion is satisfied by maintaining poles of said closed-loop transfer function at desired constant values.

* * * * *

UNITED STATES PATENT AND TRADEMARK OFFICE
CERTIFICATE OF CORRECTION

PATENT NO. : 4,879,643
DATED : November 7, 1989
INVENTOR(S) : Abhijit J. M. Chakravarty et al.

It is certified that error appears in the above-identified patent and that said Letters Patent is hereby corrected as shown below:

Column 2, line 54, delete "FIG. 4" and insert --FIG. 5--.

Column 3, lines 32 and 33, "(wk-1, wk-2...." should be
$$--(w_{k-1}, w_{k-2},...)--.$$

Column 3, line 39, "$y_k = \Theta T_k x_k + w_k$" should be
$$--y_k = \Theta^T_k x_k + w_k--.$$

Column 3, line 41, after "$c_1 \ c_2 ...$" insert a bracket --]--.

Column 3, line 51, the bracketed equation number "[4]" should be to the right margin.

Column 3, line 60, after "rewritten" add --as:--.

Column 3, line 62, "$k = (B_k/A_k)u_k + (C_k/A_k)w_k$" should be
$$--y_k = (B_k/A_k)u_k + (C_k/A_k)w_k--.$$

Column 5, line 6, "closedloop" should be --closed-loop--.

Column 5, line 6, after "function" insert --$\hat{B}_k \hat{E}_k/H$--.

Column 5, line 33, "$u_k$" should be --$u'_k$--.

Column 5, line 43, after "close to" insert --0--.

Column 7, line 6, after "transfer" delete the comma (,).

UNITED STATES PATENT AND TRADEMARK OFFICE
CERTIFICATE OF CORRECTION

PATENT NO. : 4,879,643

DATED : November 7, 1989

INVENTOR(S) : Abhijit J. M. Chakravarty et al.

It is certified that error appears in the above-identified patent and that said Letters Patent is hereby corrected as shown below:

Column 7, lines 6 and 7, after "function" insert a period --.--.

Column 7, line 10, "kk" should be --$\hat{E}_k, \hat{F}_k$--.

Column 7, line 11, "Y'k" should be --$y'_k$--.

Column 7, line 36, "FIG." should be --FIG. 5--.

Column 7, line 44, between "provided" and "to" insert --as input--.

Column 7, line 58, between "speed" and "When" insert a period --.--.

Column 8, line 9, delete line 9 and insert:

--$p^{-1}_k = p^{-1}_{k-1} + \beta \hat{x}_k \hat{x}_k$--, with the the bracketed equation number "[10]" moved to the right margin.

Column 8, line 15, the bracketed equation number "[11]" should be to the right margin.

Column 8, line 17, "...$c_1 c_2$[12]" should be --... $c_1$ $c_2$... ]--, with the bracketed equation number "[12]" moved to the right margin.

UNITED STATES PATENT AND TRADEMARK OFFICE
CERTIFICATE OF CORRECTION

PATENT NO. : 4,879,643

DATED : November 7, 1989

INVENTOR(S) : Abhijit J. M. Chakravarty et al.

It is certified that error appears in the above-identified patent and that said Letters Patent is hereby corrected as shown below:

Column 8, line 21, delete line 21 and insert:
   --$\hat{A}_k = [0\ a_1 z^{-1}\ a_2 z^{-2} \ldots\ ]$--, with the bracketed equation number "[13]" moved to the right margin.

Column 8, line 28, delete line 28 and insert:
   --$\hat{w}_k = y_k - \hat{\Theta}^T_k \hat{x}_k.$--, with a bracketed equation number --[15]-- inserted at the right margin.

Column 8, line 43, delete line 43 and insert:
   --$m_k = (\hat{\Theta}^T_k P_k^{-1} \hat{\Theta}_k)/(3 + \hat{\Theta}^T_k P_k^{-1} \hat{\Theta}_k)$--, with the bracketed equation number "[17]" moved to the right margin.

Column 11, line 2-3, after "producing" insert --a--.

UNITED STATES PATENT AND TRADEMARK OFFICE
CERTIFICATE OF CORRECTION

PATENT NO. : 4,879,643
DATED : November 7, 1989
INVENTOR(S) : Abhijit J. M. Chakravarty, et. al.

It is certified that error appears in the above-indentified patent and that said Letters Patent is hereby corrected as shown below:

Column 13, line 3, delete "controller in accordance".

Signed and Sealed this

Fifteenth Day of March, 1994

Attest:

BRUCE LEHMAN

Attesting Officer    Commissioner of Patents and Trademarks